United States Patent
Iyer et al.

(10) Patent No.: US 11,498,872 B2
(45) Date of Patent: Nov. 15, 2022

(54) GYPSUM BOARD AND GYPSUM SLURRY FORMED USING A PHOSPHORUS CONTAINING COMPOUND

(71) Applicant: National Gypsum Properties, LLC, Charlotte, NC (US)

(72) Inventors: R. G. Iyer, Fort Mill, SC (US); Eli Stav, Charlotte, NC (US); Ma-Ikay Miatudila, Monroe, NC (US); Joseph J. Bailey, Charlotte, NC (US)

(73) Assignee: Gold Bond Building Products, LLC, Charlotte, NC (US)

( * ) Notice: Subject to any disclaimer, the term of this patent is extended or adjusted under 35 U.S.C. 154(b) by 421 days.

(21) Appl. No.: 16/693,442

(22) Filed: Nov. 25, 2019

(65) Prior Publication Data

US 2020/0165165 A1 May 28, 2020

Related U.S. Application Data

(60) Provisional application No. 62/772,136, filed on Nov. 28, 2018.

(51) Int. Cl.
| | | |
|---|---|---|
| C04B 28/14 | (2006.01) | |
| C04B 22/16 | (2006.01) | |
| C04B 24/16 | (2006.01) | |
| C04B 111/00 | (2006.01) | |
| C04B 103/40 | (2006.01) | |

(52) U.S. Cl.
CPC ............ *C04B 28/14* (2013.01); *C04B 22/16* (2013.01); *C04B 24/166* (2013.01); *C04B 2103/408* (2013.01); *C04B 2111/0062* (2013.01)

(58) Field of Classification Search
CPC . C04B 28/14; C04B 2103/408; C04B 24/166; C04B 22/16; C04B 2111/0062
USPC ......................................................... 428/703
See application file for complete search history.

(56) References Cited

U.S. PATENT DOCUMENTS

| | | | |
|---|---|---|---|
| 6,379,458 B1 | 4/2002 | Immordino et al. | |
| 6,409,825 B1 * | 6/2002 | Yu ........................... | C04B 28/14 106/776 |
| 7,731,794 B2 | 6/2010 | Yu et al. | |
| 9,382,153 B2 * | 7/2016 | Fisher ..................... | C04B 14/00 |
| 9,840,066 B2 | 12/2017 | Yu et al. | |
| 2008/0148997 A1 * | 6/2008 | Blackburn .............. | C04B 28/14 106/781 |
| 2008/0286474 A1 * | 11/2008 | Chevalier .............. | C08G 77/08 524/415 |
| 2009/0011207 A1 | 1/2009 | Dubey | |
| 2015/0125683 A1 | 5/2015 | Cao et al. | |
| 2016/0060168 A1 * | 3/2016 | Stav ........................ | C04B 28/14 156/39 |
| 2017/0096366 A1 | 4/2017 | Vilinska et al. | |
| 2017/0334778 A1 | 11/2017 | Vilinska et al. | |
| 2017/0362124 A1 | 12/2017 | Sang et al. | |

* cited by examiner

*Primary Examiner* — Hui H Chin
(74) *Attorney, Agent, or Firm* — Dority & Manning, P.A.

(57) ABSTRACT

In general, the present invention is directed to the use of particular phosphorus containing compounds for making a gypsum board. The phosphorus containing compound may be a phosphite or a phosphate having a certain formula. In this regard, the present invention is directed to a slurry for making a gypsum board wherein the slurry includes such phosphorus containing compound. The present invention is also directed to a method of making a gypsum board from the slurry as well as a resulting gypsum board.

17 Claims, No Drawings

GYPSUM BOARD AND GYPSUM SLURRY FORMED USING A PHOSPHORUS CONTAINING COMPOUND

CROSS-REFERENCE TO RELATED APPLICATION

The present application claims filing benefit of U.S. Provisional Patent Application Ser. No. 62/772,136 having a filing date of Nov. 28, 2018, and which is incorporated herein by reference in its entirety

BACKGROUND OF THE INVENTION

Gypsum board is commonly employed in drywall construction of interior walls and ceilings and also has other applications. Generally, these gypsum boards are formed from a gypsum slurry including a mixture of calcined gypsum, water, and other conventional additives. The mixture is cast and allowed to set by reaction of the calcined gypsum with the water. During the production process, free or unreacted water is removed in order to provide a relatively dry product. Typically, the amount of water necessary for forming the slurry is in excess of what is needed to complete the hydration reaction in order to provide a slurry having sufficient fluidity to flow out of a mixer and onto a facing material while also being able to be shaped to an appropriate width and thickness. In order to provide a stable board, once the gypsum has set, the excess water is removed through drying. However, the presence of excess water can create difficulties during processing. For instance, the excess water may extend the time in which the continuous gypsum sheet can be cut. Further, additional energy may be necessary to remove the excess water from the gypsum board. As a result, both limitations may result in an increase in cost and slower production.

As a result, there is a need to provide an improved method of making a gypsum board.

SUMMARY OF THE INVENTION

In accordance with one embodiment of the present invention, a slurry for making a gypsum board is disclosed. The slurry comprises stucco, water, and a phosphorus containing compound comprising a phosphite, a phosphate having the formula $P(O)_n(X)_m$ wherein n is from 0 to 4, m is from 0 to 6, the sum of n and m is from 3 to 6, and X is hydrogen, halogen, sulfur, or selenium, a salt thereof, or a mixture thereof.

In accordance with another embodiment of the present invention, a method for making a gypsum board is disclosed. The method comprises a step of depositing a slurry comprising stucco, water, and a phosphorus containing compound comprising a phosphite, a phosphate having the formula $P(O)_n(X)_m$ wherein n is from 0 to 4, m is from 0 to 6, the sum of n and m is from 3 to 6, and X is hydrogen, halogen, sulfur, or selenium, a salt thereof, or a mixture thereof on a first facing material. The method further comprises providing a second facing material on the slurry and allowing the stucco to convert to calcium sulfate dihydrate.

In accordance with another embodiment of the present invention, a gypsum board is disclosed. The gypsum board comprises gypsum and a phosphorus containing compound comprising a phosphite, a phosphate having the formula $P(O)_n(X)_m$ wherein n is from 0 to 4, m is from 0 to 6, the sum of n and m is from 3 to 6, and X is hydrogen, halogen, sulfur, or selenium, a salt thereof, or a mixture thereof.

Other features and aspects of the present invention are set forth in greater detail below.

DETAILED DESCRIPTION

It is to be understood by one of ordinary skill in the art that the present discussion is a description of exemplary embodiments only and is not intended as limiting the broader aspects of the present invention.

Generally speaking, the present invention is directed to a method of making a gypsum slurry and a gypsum board using a certain phosphorus containing compound as defined herein. The present inventors have discovered that such compound allows for an improved method of manufacture while still providing a board having desirable mechanical properties and characteristics.

As an example, by using the phosphorus containing compound as disclosed herein, in certain embodiments, the set time of the gypsum may be shortened which can in turn allow for an increase in production, for example because of an increase in line speed. For example, by decreasing the set time, the gypsum board may be cut sooner during the process. Furthermore, in other embodiments, the stiffening time may be extended while maintaining a substantially similar set time. This may allow for the mixer to remain relatively cleaner while also allow for the board to have sufficient strength and hardness at the knife. In fact, as further indicated below, the board properties, such as nail pull resistance, may even be improved due to the use of the phosphorus containing compound. In addition to the properties mentioned above, the present inventors have discovered that the phosphorus containing compound may also allow for a substantial reduction, as further defined below, in the amount of water necessary during the process. In turn, such reduction may result in less time necessary after cutting as well as heating in a heating device, such as a kiln, for the removal of any excess free water. In this regard, with such reduction in time, this may also allow for an increase in production in addition to a decrease in costs.

Generally, setting of a gypsum slurry is characterized by initial and final set times. Generally, the final set time corresponds to the time when a product or slurry has sufficiently hardened, for instance to be cut in a clear manner such that it can be handled. It will be understood by those skilled in the art that hydration reactions continue for extended periods even after the final set time has been reached.

Generally, setting may be referred to as the rate of hydration. The rate of hydration may be evaluated on the basis of the "Time to 50% Hydration." For example, this time can be calculated by determining the temperature increase caused by the hydration and then measuring the amount of time required to generate the temperature rise. The mid-point in time has been found to correspond to the Time to 50% Hydration, as is known to those skilled in the art. In this regard, with the use of the phosphorus containing compound, the Time to 50% Hydration of the calcined gypsum may be about 10 minutes or less, such as about 9 minutes or less, such as about 8 minutes or less, such as about 7 minutes or less, such as about 6 minutes or less, such as about 5 minutes or less, such as about 4 minutes or less, such as 3 minutes or less, such as about 2.5 minutes or less. The Time to 50% Hydration may be about 0.5 minutes or more, such as about 0.75 minutes or more, such as about 1 minute or more, such as about 1.5 minutes or more, such as about 2 minutes or more. Such times may be for a ⅝" board. However, it should be understood that such times may also be for a board having another thickness as indicated herein. In addition, such times may be for a specific line speed. In addition, this time may depend on certain other process parameters such as the type of board and slurry, board thickness, facing material, dryer efficiency, and/or slurry additives.

The stiffening time may be about 5 minutes or less, such as about 4 minutes or less, such as about 3 minutes or less, such as about 2 minutes or less, such as about 1.5 minutes or less, such as about 1.4 minutes or less, such as about 1.2 minutes or less, such as about 1.1 minutes or less, such as about 1 minute or less, such as about 0.9 minutes or less, such as about 0.8 minutes or less, such as about 0.7 minutes or less, such as about 0.6 minutes or less, such as about 0.5 minutes or less. The stiffening time may be about 0.1 minutes or more, such as about 0.2 minutes or more, such as about 0.3 minutes or more, such as about 0.4 minutes or more, such as about 0.5 minutes or more, such as about 0.6 minutes or more, such as about 0.7 minutes or more, such as about 0.8 minutes or more, such as about 0.9 minutes or more, such as about 1 minute or more. Such times may be for a ⅝" board. However, it should be understood that such times may also be for a board having another thickness as indicated herein.

In particular, the stiffening time may be extended in comparison to a gypsum board formed without the phosphorus containing compound as described herein. In particular, such stiffening time may be extended by 5% or more, such as 10% or more, such as 15% or more, such as 20% or more, such as 25% or more, such as 30% or more, such as 40% or more, such as 50% or more, such as 60% or more, such as 70% or more, such as 80% or more. Such extension of the stiffening time may be 100% or less, such as 90% or less, such as 80% or less, such as 70% or less, such as 60% or less, such as 50% or less, such as 40% or less. In addition, even with the extension of the stiffening time, the ¼ pound set time may not be substantially affected.

For instance, the set time, as tested according to ASTM C266 using a ¼ pound Gillmore needle may be about 10 minutes or less, such as about 8 minutes or less, such as about 6 minutes or less, such as about 5 minutes or less, such as about 4 minutes or less, such as about 3.5 minutes or less, such as about 3.25 minutes or less, such as about 3 minutes or less, such as about 2.9 minutes or less, such as about 2.8 minutes or less, such as about 2.7 minutes or less, such as about 2.6 minutes or less, such as about 2.5 minutes or less, such as about 2.4 minutes or less. The set time may be about 0.5 minutes or more, such as about 1 minute or more, such as about 1.5 minutes or more, such as about 1.75 minutes or more, such as about 2 minutes or more, such as about 2.1 minutes or more, such as about 2.2 minutes or more, such as about 2.3 minutes or more, such as about 2.4 minutes or more, such as about 2.5 minutes or more, such as about 3 minutes or more, such as about 3.5 minutes or more, such as about 4 minutes or more, such as about 5 minutes or more. Such times may be for a ⅝" board. However, it should be understood that such times may also be for a board having another thickness as indicated herein.

In this regard, the set time may be within at least 1%, such as at least 2%, such as at least 3%, such as at least 5%, such as at least 10%, such as at least 15%, such as at least 20%, such as at least 25%, such as at least 30%, such as at least 40%, such as at least 50% of the set time of a process and slurry that does not utilize a phosphorus containing compound as defined herein. Such percentages may be for a ⅝" board. However, it should be understood that such percentages may also be for a board having another thickness as indicated herein.

Furthermore, in some embodiments, the time from the deposition of the slurry to the cutter may be reduced when using the phosphorus containing compound as disclosed herein. In particular, the time may be reduced by at least 1%, such as at least about 2%, such as at least 3%, such as at least 5%, such as at least 10%, such as at least 15%, such as at least 20% in comparison to the same process and slurry without the use of a phosphorus containing compound as defined herein. In addition, such time may be reduced by 50% or less, such as 40% or less, such as 30% or less, such as 25% or less, such as 20% or less, such as 15% or less in comparison to the same process and slurry without the use of a phosphorus containing compound as defined herein. Such percentages may be for a ⅝" board. However, it should be understood that such percentages may also be for a board having another thickness as indicated herein. In general, the cutter may be positioned at least at the point of about 80% hydration, such as at least about 85% hydration, such as at least about 90% hydration, such as at least about 95% hydration, such as at least about 97% hydration, such as at least about 98% hydration for the gypsum.

In addition, when making a gypsum board with the phosphorus containing compound as disclosed herein, the resulting board may exhibit desired properties, for instance even with an increase in stiffening time or faster set time. In particular, these properties may be achieved even though the amount of water employed in the process may be reduced because of use of the phosphorus containing compound. For instance, with the reduction in water, the gypsum may still set sufficiently to allow for the desired properties to be realized.

The gypsum board may have a certain nail pull resistance, which generally is a measure of the force required to pull a gypsum panel off of a wall by forcing a fastening nail through the panel. The values obtained from the nail pull test generally indicate the maximum stress achieved while the fastener head penetrates through the board surface and core. In certain embodiments, the nail pull resistance may be improved due to the use of the phosphorus containing compound as defined herein. In this regard, the gypsum board exhibits a nail pull resistance of at least about 25 $lb_f$, such as at least about 30 pounds, such as at least about 35 $lb_f$, such as at least about 40 $lb_f$, such as at least about 45 $lb_f$, such as at least about 50 $lb_f$, such as at least about 55 $lb_f$, such as at least about 60 $lb_f$, such as at least about 65 $lb_f$, such as at least about 70 $lb_f$, such as at least about 75 $lb_f$, such as at least about 77 $lb_f$, such as at least about 80 $lb_f$, such as at least about 85 $lb_f$, such as at least about 90 $lb_f$, such as at least about 95 $lb_f$, such as at least about 100 $lb_f$ as determined according to ASTM C1396. The nail pull resistance may be about 150 $lb_f$ or less, such as about 140 $lb_f$ or less, such as about 130 $lb_f$ or less, such as about 120 $lb_f$ or less, such as about 110 $lb_f$ or less, such as about 105 $lb_f$ or less, such as about 100 $lb_f$ or less, such as about 95 $lb_f$ or less, such as about 90 $lb_f$ or less, such as about 85 $lb_f$ or less, such as about 80 $lb_f$ or less as determined according to ASTM C1396. Such nail pull resistance may be based upon the thickness of the gypsum board. For instance, when conducting a test, such nail pull resistance values may vary depending on the thickness of the gypsum board. As an example, the nail pull resistance values above may be for a ⅝ inch board. However, it should be understood that instead of a ⅝ inch board, such nail pull resistance values may be for any other thickness gypsum board as mentioned herein.

The gypsum board may have a certain compressive strength. For instance, the compressive strength may be about 150 psi or more, such as about 200 psi or more, such as about 250 psi or more, such as about 300 psi or more, such as about 350 psi or more, such as about 375 psi or more, such as about 400 psi or more, such as about 500 psi or more as tested according to ASTM C473. The compressive strength may be about 3000 psi or less, such as about 2500 psi or less, such as about 2000 psi or less, such as about 1700 psi or less, such as about 1500 psi or less, such as about 1300 psi or less, such as about 1100 psi or less, such as about 1000 psi or less, such as about 900 psi or less, such as about 800 psi or less, such as about 700 psi or less, such as about 600 psi or less, such as about 500 psi or less. Such compressive strength may be based upon the thickness of the gypsum board. For instance, when conducting a test, such compressive strength values may vary depending on the thickness of the gypsum board. As an example, the compressive strength values above may be for a ⅝ inch board. However, it should be understood that instead of a ⅝ inch board, such compressive strength values may be for any other thickness gypsum board as mentioned herein.

In addition, the gypsum board may have a core hardness of at least about 8 $lb_f$, such as at least about 10 pounds, such as at least about 11 $lb_f$, such as at least about 12 $lb_f$, such as at least about 15 $lb_f$, such as at least about 18 $lb_f$, such as at least about 20 $lb_f$ as determined according to ASTM C1396. The gypsum board may have a core hardness of 50 $lb_f$ or less, such as about 40 $lb_f$ or less, such as about 35 $lb_f$ or less, such as about 30 $lb_f$ or less, such as about 25 $lb_f$ or less, such as about 20 $lb_f$ or less, such as about 18 $lb_f$ or less, such as about 15 $lb_f$ or less as determined according to ASTM C1396. In addition, the gypsum board may have an end hardness according to the aforementioned values. Further, the gypsum board may have an edge hardness according to the aforementioned values. Such core hardness may be based upon the thickness of the gypsum board. For instance, when conducting a test, such core hardness values may vary depending on the thickness of the gypsum board. As an example, the core hardness values above may be for a ⅝ inch board. However, it should be understood that instead of a ⅝ inch board, such core hardness values may be for any other thickness gypsum board as mentioned herein.

In addition, it may also be desired to have an effective bond between the facing material and the gypsum core. Typically, a humidified bond analysis is performed for 2 hours in a humidity chamber at 90° F. and 90% humidity. In this test, after exposure, the facing material is removed to determine how much remains on the gypsum board. The percent coverage can be determined using various optical analytical techniques. In this regard, the facing material may cover less than 50%, such as less than 40%, such as less than 30%, such as less than 25%, such as less than 20%, such as less than 15%, such as less than 10%, such as less than 9%, such as less than 8% of the surface area of the gypsum core upon conducting the test. Such percentage may be for a face of the gypsum board. Alternatively, such percentage may be for a back of the gypsum board. Further, such percentages may apply to the face and the back of the gypsum board. In addition, such values may be for an average of at least 3 gypsum boards, such as at least 5 gypsum boards.

As indicated herein, the present invention utilizes a phosphorus containing compound for improving the process of making a gypsum slurry and a gypsum board as well as a resulting gypsum slurry and gypsum board. In general, gypsum board is made from a gypsum slurry. According to the present invention, the gypsum slurry includes at least stucco, a phosphorus containing compound as defined herein, and water.

In general, stucco may be referred to as calcined gypsum or calcium sulfate hemihydrate. The calcined gypsum may be from a natural source or a synthetic source and is thus not necessarily limited by the present invention. In addition to the stucco, the gypsum slurry may also contain some calcium sulfate dihydrate and/or calcium sulfate anhydrite. If calcium sulfate dihydrate is present, the hemihydrate is present in an amount of at least 50 wt. %, such as at least 60 wt. %, such as at least 70 wt. %, such as at least 80 wt. %, such as at least 85 wt. %, such as at least 90 wt. %, such as at least 95 wt. %, such as at least 98 wt. %, such as at least 99 wt. %, based on the weight of the calcium sulfate hemihydrate and the calcium sulfate dihydrate. Furthermore, the calcined gypsum may be α-hemihydrate, β-hemihydrate, or a mixture thereof.

In addition to the stucco, the gypsum slurry may also contain other hydraulic materials. These hydraulic materials may include calcium sulfate anhydrite, land plaster, cement, fly ash, or any combinations thereof. When present, they may be utilized in an amount of 30 wt. % or less, such as 25 wt. % or less, such as 20 wt. % or less, such as 15 wt. % or less, such as 10 wt. % or less, such as 8 wt. % or less, such as 5 wt. % or less based on the total content of the hydraulic material.

The phosphorus containing compound may be a phosphite, a phosphate having the formula $P(O)_n(X)_m$ wherein n is from 0 to 4, m is from 0 to 6, the sum of n and m is from 3 to 6, and X is hydrogen, halogen, sulfur, or selenium, a salt thereof, or a mixture thereof. In one embodiment, the phosphorus containing compound comprises a phosphite or a salt thereof. In another embodiment, the phosphorus containing compound comprises a phosphate having the formula $P(O)_n(X)_m$ wherein n is from 0 to 4, m is from 0 to 6, the sum of n and m is from 3 to 6, and X is hydrogen, halogen, sulfur, or selenium, or a salt thereof. In a further embodiment, the phosphorus containing compound comprises a combination of a phosphite or a salt thereof and a phosphate having the formula $P(O)_n(X)_m$ wherein n is from 0 to 4, m is from 0 to 6, the sum of n and m is from 3 to 6, and X is hydrogen, halogen, sulfur, or selenium, or a salt thereof.

As indicated above, the phosphorus containing compound may be a phosphate having the formula $P(O)_n(X)_m$ wherein n is from 0 to 4, m is from 0 to 6, the sum of n and m is from 3 to 6, and X is hydrogen, halogen, sulfur, or selenium, or a salt thereof. In this regard X may be hydrogen, halogen, or sulfur. For instance, X may be halogen or sulfur. In one embodiment, X may be sulfur. In a further embodiment, X may be selenium. In another embodiment, X may be hydrogen. In another embodiment, X may be halogen. For instance, the halogen may be fluorine (or fluoro), chlorine (or chloro), bromine (or bromo), iodine (or iodo), or any combination thereof. For instance, in one embodiment, the halogen may be fluorine (or fluoro). It should be noted that when m is greater than 1, each X may be independent of another X. That is, each X may be identical or alternatively, one X may be different from another X.

In addition, as indicated above, n is from 0 to 4, such as from 1 to 4, such as from 2 to 4, such as from 2 to 3. Thus, n may be at least 0, such as at least 1, such as at least 2, such as at least 3 to 4 or less, such as 3 or less, such as 2 or less, such as 1 or less. Thus, n may be 0. Further, n may be 1. In another embodiment, n may be 2. In a further embodiment, n may be 3. In another further embodiment, n may be 4.

Also, as indicated above, m is from 0 to 6, such as from 1 to 6, such as from 1 to 5, such as from 1 to 4, such as from 1 to 3, such as from 1 to 2 or 2 to 3. Thus, m may be at least 0, such as at least 1, such as at least 2, such as at least 3, such as at least 4, such as at least 5 to 6 or less, such as 5 or less, such as 4 or less, such as 3 or less, such as 2 or less, such as 1 or less. In this regard, m may be 1. In another embodiment, m may be 2. In a further embodiment, m may be 3. In another further embodiment, m may be 4. In one embodiment, m may be 5. Finally, in a further embodiment, m may be 6.

In addition, as indicated above, the sum of n and m may be from 3 to 6. In this regard, the sum of n and m may be at least 3, such as at least 4, such as at least 5 to 6 or less, such as 5 or less, such as 4 or less. In one embodiment, the sum of n and m may be 3. In another embodiment, the sum of n and m may be 4. In a further embodiment, the sum of n and m may be 5. In another further embodiment, the sum of n and m may be 6.

In one particular embodiment, X may be halogen, such as fluorine (fluoro), n may be 3, and m may be 1. In another particular embodiment, X may be halogen, such as fluorine (fluoro), n may be 2, and m may be 2. In this regard, when X is halogen, the phosphorus containing compound may be referred to as a halophosphate.

When the phosphorus containing compound comprises a halophosphate, the halo may be any halogen atom suitable for the present invention. In this regard, the halogen may be fluorine (or fluoro), chlorine (or chloro), bromine (or bromo), iodine (or iodo), or any combination thereof. For instance, in one embodiment, the halogen may be fluorine (or fluoro) such that the halophosphate is a fluorophosphate. In another embodiment, the halogen may be chlorine (or chloro) such that the halophosphate is a chlorophosphate.

Further, the halophosphate may comprise any number of halogen atoms. For instance, the halophosphate may include at least 1 halogen atom, such as at least 2 halogen atoms, such as at least 3 halogen atoms, such as at least 4 halogen atoms, such as at least 5 halogen atoms, such as at least 6 halogen atoms. In this regard, the halophosphate may be a monohalophosphate, a dihalophosphate, a trihalophosphate, a tetrahalophosphate, a pentahalophosphate, a hexahalophosphate, or any mixture thereof. In one embodiment, the halophosphate includes a monohalophosphate. In another embodiment, the halophosphate includes a dihalophosphate.

As indicated above, the halogen may be fluorine. In this regard, the halophosphate may be a fluorophosphate. In particular, the fluorophosphate may be a monofluorophosphate, a difluorophosphate, a trifluorophosphate, a tetrafluorophosphate, a pentafluorophosphate, a hexafluorophosphate, or any mixture thereof. In one embodiment, the fluorophosphate may include a monofluorophosphate. In another embodiment, the fluorophosphate may include a difluorophosphate.

As also indicated above, X may be a hydrogen. In this regard, m may be 1. In one embodiment, m may be 2 such that the phosphate is a dihydrogen phosphate. In a particular embodiment, the compound may be a bis(dihydrogen phosphate). In another particular embodiment, the compound may be a tris(dihydrogen phosphate).

As indicated above, the phosphorus containing compound may be a phosphite. For instance, the phosphite may be an anion having the general formula $[HPO_3]^{2-}$. In this regard, the phosphite may be a salt of phosphorus acid. In one embodiment, the phosphite may have the formula of the aforementioned phosphate wherein X is H. The remaining parameters of such formula may be the same as defined above and herein with respect to the phosphate. For instance, in the above formula, n may be 3 and m may be 1.

Furthermore, the phosphorus containing compound may be a salt. In this regard, the phosphorus containing compound may include ammonium, a metal, or a combination thereof. In one embodiment, the phosphorus containing compound includes ammonium. In another embodiment, the phosphorus containing compound includes a metal.

When the phosphorus containing compound includes a metal, the metal may be any employed in the art. For instance, the metal may be an alkali metal, an alkaline earth metal, a transition metal, or a combination thereof. In one embodiment, the metal may be an alkali metal. For instance, the alkali metal may be lithium, sodium, potassium, or a combination thereof. In one particular embodiment, the alkali metal may be sodium, potassium, or a combination thereof. In another particular embodiment, the alkali metal may include sodium.

In another embodiment, the metal may be an alkaline earth metal. For instance, the alkaline earth metal may be beryllium, magnesium, calcium, strontium, barium, or a combination thereof. In one particular embodiment, the alkaline earth metal may be magnesium, calcium, or a combination thereof.

In a further embodiment, the metal may be a transition metal. For instance, the transition metal may be manganese, iron, cobalt, nickel, copper, zinc, titanium, chromium, platinum, gold, molybdenum, palladium, silver, tantalum, tungsten, etc., or a combination thereof.

In addition to alkali metals, alkaline earth metals, and transition metals, other metals may also be employed. For instance, the metal may be aluminum, indium, tin, bismuth, etc., or a combination thereof.

Furthermore, one mole of metal may be present. Alternatively, in one embodiment, two moles of metal may be present. As an example, the metal may simply be sodium. Alternatively, the metal may be disodium. In this regard, the number of moles of metal may depend on the charge of the anion. Thus, if the anion has a charge of −6, six moles of sodium may be required.

The phosphorus containing compound may be present in the gypsum slurry in an amount of 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more based on the weight of the stucco. The phosphorus containing compound may be present in an amount of 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less based on the weight of the stucco.

As indicated above, the gypsum slurry may also include water. Water may be employed for fluidity and also for rehydration of the gypsum to allow for setting. The amount of water utilized is not necessarily limited by the present invention. However, it should be understood that as indicated herein, the utilization of the phosphorus containing compound may allow for a reduction in the amount of water required in comparison to a process that may not utilize the phosphorus containing compound.

In addition, the weight ratio of the water to the stucco may be 0.1 or more, such as 0.2 or more, such as 0.3 or more, such as 0.4 or more, such as 0.5 or more. The water to stucco weight ratio may be 4 or less, such as 3.5 or less, such as 3 or less, such as 2.5 or less, such as 2 or less, such as 1.7 or less, such as 1.5 or less, such as 1.4 or less, such as 1.3 or less, such as 1.2 or less, such as 1.1 or less, such as 1 or less, such as 0.9 or less, such as 0.85 or less, such as 0.8 or less, such as 0.75 or less, such as 0.7 or less, such as 0.6 or less, such as 0.5 or less, such as 0.4 or less, such as 0.35 or less, such as 0.3 or less, such as 0.25 or less, such as 0.2 or less. With the use of the phosphorus containing compound as disclosed herein, the amount of water required may be less than other conventional processes. For instance, the gypsum slurry may require a reduction in the amount of water necessary by at least 5 wt. %, such as at least 8 wt. %, such as at least 10 wt. %, such as at least 15 wt. %, such as at least 20 wt. %, such as at least 25 wt. % and less than 50 wt. %, such as less than 40 wt. %, such as less than 30 wt. %, such as less than 25 wt. %, such as less than 20 wt. %, in comparison to a gypsum slurry that does not contain a phosphorus containing compound as disclosed herein. Even with a reduction in water, the slurry may exhibit a similar slump, stiffening time, and/or set time in comparison to a slurry that does not contain a phosphorus containing compound as disclosed herein. For instance, such property of the slurry may be within 1%, such as within 3%, such as within 5%, such as within 10%, such as within 15%, such as within 20% of the property of slurry that does not contain a phosphorus containing compound as disclosed herein.

In addition to the stucco, the phosphorus containing compound, and the water, the gypsum slurry may also include any other conventional additives as known in the art. In this regard, such additives are not necessarily limited by the present invention. For instance, the additives may include dispersants, foam or foaming agents including aqueous foam (e.g. sulfates), set accelerators (e.g., BMA, land plaster, sulfate salts, etc.), set retarders, binders, biocides (such as bactericides and/or fungicides), adhesives, pH adjusters, thickeners (e.g., silica fume, Portland cement, fly ash, clay, celluloses, high molecular weight polymers, etc.), leveling agents, non-leveling agents, starches (such as pregelatinized starch, non-pregelatinized starch, and/or an acid modified starch), colorants, fire retardants or additives (e.g., silica, silicates, expandable materials such as vermiculite, perlite, etc.), water repellants, fillers (e.g., glass fibers), waxes, secondary phosphates (e.g., condensed phosphates or orthophosphates including trimetaphosphates, polyphosphates, and/or cyclophosphates, etc.), polymers (natural polymers, synthetic polymers), mixtures thereof, etc. In general, it should be understood that the types and amounts of such additives are not necessarily limited by the present invention.

In general, each additive may be present in the gypsum slurry in an amount of 0.0001 wt. % or more, such as 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more, such as 1 wt. % or more, such as 2 wt. % or more based on the weight of the stucco. The additive may be present in an amount of 20 wt. % or less, such as 15 wt. % or less, 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less based on the weight of the stucco.

As indicated above, the additives may include at least one dispersant. The dispersant is not necessarily limited and may include any that can be utilized within the gypsum slurry and the phosphorus containing compound disclosed herein. The dispersant may include carboxylates, sulfates, sulfonates, mixtures thereof, etc. For instance, in one embodiment, the dispersant may include a sulfate.

In another embodiment, the dispersant may include a carboxylate, such as a carboxylate ether and in particular a polycarboxylate ether or a carboxylate ester and in particular a polycarboxylate ester. In general, the carboxylate or polycarboxylate may be derived from an acrylic acid or a salt thereof, such as a methacrylic acid or a salt thereof. In addition, the polycarboxylate ether copolymer optionally has additional structural groups in copolymerized form. In this case, the additional structural groups may include styrenes, acrylamides, hydrophobic compounds, ester repeating unit, polypropylene oxide and polypropylene oxide/polyethylene oxide units. In addition, any comb-branched polycarboxylate dispersant may be useful in the slurry. In particular, the polycarboxylate dispersant may be one having polyether side chains. The polycarboxylate ester in some embodiments may be prepared by polymerization of a monomer mixture containing a carboxylic acid monomer as the main component. In other embodiments, it is advantageous if the formula (I) represents a polyether containing alkyl or vinyl groups. An aspect of many polycarboxylate esters is their antifoaming, defoaming and/or surface active properties. Therefore in some embodiments where the dispersant component is such a polycarboxylate ester, the dispersant component can provide antifoaming and surfactant effects in addition to their dispersing effect. In some embodiments, the monomer mixture includes an (alkoxy)polyalkylene glycol mono (meth)acrylate monomer of the general formula (II):

In particular, the dispersant may include a sulfonate, such as a naphthalene sulfonate, a lignosulfonate, or a mixture thereof. In particular, the sulfonate may be a polynaphthalene sulfonate. The naphthalene sulfonate may have an average molecular weight of at least about 1000 g/mol, such as at least about 2000 g/mol, such as at least about 3000 g/mol, such as at least about 5000 g/mol, such as about at least about g/mol to about 40000 g/mol or less, such as about 30000 g/mol or less, such as about 25000 g/mol or less, such as about 20000 g/mol or less, such as about 15000 g/mol or less, such as about 10000 g/mol or less, such as about 8000 g/mol or less.

In this regard, the dispersant may include a sulfonate, a polycarboxylate ether, a polycarboxylate ester, or a mixture thereof.

As indicated above, the additives may include at least one accelerator. The accelerator is not necessarily limited and may include any that can be utilized within the gypsum slurry and the phosphorus containing compound disclosed herein. The accelerator may include ground or unground gypsum such as from a ball mill accelerator, land plaster, sulfate salts, etc., as well as a mixture thereof. In one embodiment, the accelerator may include at least a ball mill accelerator (BMA).

The slurry may also have a certain volume content of air. For instance, 1% or more, such as 5% or more, such as 10% or more, such as 20% or more, such as 25% or more, such as 30% or more of the slurry volume may be air. In addition, 80% or less, such as 70% or less, such as 60% or less, such as 50% or less, such as 40% or less of the slurry volume may be air. The volume may be formed by employing an aqueous foam.

The slurry may also have a particular slump as defined herein. For instance, the slump may be 5 inches or more, such as 6 inches or more, such as 6.5 inches or more, such as 6.75 inches or more, such as 7 inches or more, such as 7.125 inches or more, such as 7.25 inches or more, such as 7.5 inches or more, such as 7.75 inches or more, such as 8 inches or more, such as 8.125 inches or more, such as 8.25 inches or more. The slump may be 10 inches or less, such as 9 inches or less, such as 8.5 inches or less, such as 8.25 inches or less, such as 8 inches or less, such as 7.75 inches or less, such as 7.5 inches or less, such as 7.25 inches or less. In general, the greater the slump, the greater the fluidity of the gypsum slurry.

The present invention is also directed to a method of making a gypsum slurry. The method includes a step of combining stucco, water, and a phosphorus containing compound as defined herein. The method may also include combining any of the other aforementioned components mentioned above with respect to the gypsum slurry.

The manner in which the components are combined is not necessarily limited. For instance, the gypsum slurry can be made using any method or device generally known in the art. In particular, the components of the slurry can be mixed or combined using any method or device generally known in the art. For instance, the components of the gypsum slurry may be combined in any type of device, such as a mixer and in particular a pin mixer. In this regard, the manner in which the phosphorus containing compound is incorporated into the gypsum slurry is not necessarily limited by the present invention. For instance, the phosphorus containing compound may be provided prior to a mixing device, directly into a mixing device, and/or after the mixing device. Further, when provided after the mixing device, the phosphorus containing compound may be provided to a canister or boot or by using a secondary mixer. In addition, the phosphorus containing compound may be provided alone, as part of a mixture, or in a solution. For instance, it may be provided or added to a mixing device or another compound either alone or as part of a mixture. For instance, the phosphorus containing compound may be combined directly with another component of the gypsum slurry. In addition, the phosphorus containing compound may be delivered as a solid, as a dispersion/solution, or a combination thereof.

In addition to a method of making a gypsum slurry, the present invention is also directed to a method of making a gypsum board. The method may include the aforementioned step of combining stucco, water, and a phosphorus containing compound as defined herein. In addition, the method may also include combining any of the other aforementioned components mentioned above with respect to the gypsum slurry. The components of the gypsum slurry may be combined in any type of device, such as a mixer and in particular a pin mixer.

Once the gypsum slurry is prepared, the method may comprise a step of depositing the gypsum slurry onto a first facing material. The first facing material may be conveyed on a conveyor system (i.e., a continuous system for continuous manufacture of gypsum board). Next, a second facing material is provided on top of the gypsum slurry such that the gypsum slurry is sandwiched between the facing materials in order to form the gypsum board.

The facing material may be any facing material as generally employed in the art. For instance, the facing material may be a paper facing material, a fibrous (e.g., glass fiber) mat facing material, or a polymeric facing material. In general, the first facing material and the second facing material may be the same type of material. Alternatively, the first facing material may be one type of material while the second facing material may be a different type of material.

In one embodiment, the facing material may include a paper facing material. For instance, both the first and second facing materials may be a paper facing material. Alternatively, in another embodiment, the facing material may be a glass mat facing material. For instance, both the first and second facing materials may be a glass mat facing material. In a further embodiment, the facing material may be a polymeric facing material. For instance, both the first and second facing materials may be a polymeric facing material.

After deposition, the calcium sulfate hemihydrate reacts with the water to convert the calcium sulfate hemihydrate into a matrix of calcium sulfate dihydrate. Such reaction may allow for the gypsum to set and become firm thereby allowing for the boards to be cut at the desired length. In this regard, the method may comprise a step of reacting calcium sulfate hemihydrate with water to form calcium sulfate dihydrate or allowing the calcium sulfate hemihydrate to convert to calcium sulfate dihydrate. In this regard, the method may allow for the slurry to set to form a gypsum board. In addition, during this process, the method may allow for dewatering of the gypsum slurry, in particular dewatering any free water instead of combined water of the gypsum slurry. Such dewatering may occur prior to the removal of any free moisture or water in a heating device after a cutting step. Thereafter, the method may also comprise a step of cutting a continuous gypsum sheet into a gypsum board. Then, after the cutting step, the method may comprise a step of supplying the gypsum board to a heating device. For instance, such heating device may be a kiln and may allow for removal of any free water. The temperature and time required for heating in such heating device are not necessarily limited by the present invention.

In this regard, the present invention is also directed to a gypsum board. The gypsum board includes a gypsum core sandwiched between two facing materials. The gypsum board may comprise calcium sulfate dihydrate and a phosphorus containing compound as defined herein or a salt thereof. For instance, the phosphorus containing compound may comprise a phosphite, a phosphate having the formula $P(O)_n(X)_m$ wherein n is from 0 to 4, m is from 0 to 6, the sum of n and m is from 3 to 6, and X is hydrogen, halogen, sulfur, or selenium, a salt thereof, or a mixture thereof. In particular, the phosphorus containing compound may comprise a phosphate having the formula $P(O)_n(X)_m$ wherein n is from 0 to 4, m is from 0 to 6, the sum of n and m is from 3 to 6, and X is hydrogen, halogen, sulfur, or selenium, a salt thereof, or a mixture thereof.

In one embodiment, the phosphorus containing compound may comprise a phosphite or a salt thereof. In another further embodiment, the phosphorus containing compound may comprise a salt of a phosphite. For example, the phosphite itself may be a phosphite anion.

In a further embodiment, the phosphorus containing compound may comprise a phosphate having the formula $P(O)_n(X)_m$ wherein n is from 0 to 4, m is from 0 to 6, the sum of n and m is from 3 to 6, and X is hydrogen, halogen, sulfur, or selenium, or a salt thereof. In another further embodiment, the phosphorus containing compound may comprise a salt of a phosphate having the formula $P(O)_n(X)_m$ wherein n is from 0 to 4, m is from 0 to 6, the sum of n and m is from 3 to 6, and X is a halogen. For example, the phosphate itself may be a phosphate anion. In an even further embodiment, the phosphorus containing compound may comprise a combination of a phosphate having the formula $P(O)_n(X)_m$ wherein n is from 0 to 4, m is from 0 to 6, the sum of n and m is from 3 to 6, and X is a halogen or sulfur or a salt thereof.

As an example, the phosphorus containing compound may be sodium monofluorophosphate. The salt includes when the components are present as ions of such compound or disassociated. For instance, the gypsum board may comprise sodium and monofluorophosphate, which may not be complexed but instead may be uncomplexed or disassociated. Additionally, when disassociated, the gypsum board may include one of the ions or both of the ions. Using the example of sodium monofluorophosphate, the gypsum board may include sodium, monofluorophosphate, or both sodium and monofluorophosphate. In one embodiment, the phosphate component, such as the halofluorophosphate (e.g., monofluorophosphate), may complex with another cation or metal.

The phosphorus containing compound may be present in an amount of 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more based on the weight of the gypsum board. The phosphorus containing compound may be present in an amount of 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less based on the weight of the gypsum board. Alternatively, rather than the weight of the board, such compound may be present in such amounts based on the weight of the calcium sulfate dihydrate.

The phosphorus containing compound may be present in an amount of 0.001 lbs/MSF or more, such as 0.01 lbs/MSF or more, such as 0.05 lbs/MSF or more, such as 0.1 lbs/MSF or more, such as 0.2 lbs/MSF or more, such as 0.25 lbs/MSF or more, such as 0.5 lbs/MSF or more, such as 0.75 lbs/MSF or more, such as 1 lb/MSF or more, such as 1.5 lbs/MSF or more, such as 2 lbs/MSF or more, such as 2.5 lbs/MSF or more, such as 3 lbs/MSF or more, such as 4 lbs/MSF or more. The phosphorus containing compound may be present in an amount of 150 lbs/MSF or less, such as 100 lbs/MSF or less, such as 50 lbs/MSF or less, such as 25 lbs/MSF or less, such as 15 lbs/MSF or less, such as 10 lbs/MSF or less, such as 5 lbs/MSF or less, such as 4 lbs/MSF or less, such as 3 lbs/MSF or less, such as 2.5 lbs/MSF or less, such as 2 lbs/MSF or less, such as 1.5 lbs/MSF or less, such as 1 lbs/MSF or less.

The thickness of the gypsum board is not necessarily limited and may be from about 0.25 inches to about 1 inch. For instance, the thickness may be at least ¼ inches, such as at least 5/16 inches, such as at least ⅜ inches, such as at least 4/10 inches, such as at least ½ inches, such as at least ⅝ inches, such as at least ¾ inches, such as at least 1 inch. In this regard, the thickness may be about any one of the aforementioned values. For instance, the thickness may be about ¼ inches. Alternatively, the thickness may be about ⅜ inches. In another embodiment, the thickness may be about ½ inches. In a further embodiment, the thickness may be about ⅝ inches. In another further embodiment, thickness may be about 1 inch. With regard to the thickness, the term "about" may be defined as within 10%, such as within 5%, such as within 4%, such as within 3%, such as within 2%, such as within 1%.

The gypsum board may also have a certain void volume. In general, the void volume may refer to the volume of the board occupied by air and not any material. The void volume of the gypsum board may be 5% or more, such as 10% or more, such as 20% or more, such as 25% or more, such as 30% or more, such as 40% or more, such as 50% or more. The void volume may be 90% or less, such as 80% or less, such as 70% or less, such as 60% or less, such as 50% or less, such as 40% or less, such as 30% or less.

In this regard, the gypsum board may have a density of about 5 pcf or more, such as about 10 pcf or more, such as about 15 pcf or more, such as about 20 pcf or more. The board may have a density of about 60 pcf or less, such as about 50 pcf or less, such as about 40 pcf or less, such as about 35 pcf or less, such as about 33 pcf or less, such as about 30 pcf or less, such as about 28 pcf or less, such as about 25 pcf or less, such as about 23 pcf or less, such as about 20 pcf or less.

In addition, the board weight of the gypsum board is not necessarily limited. For instance, the gypsum board may have a board weight of 500 lbs/MSF or more, such as about 600 lbs/MSF or more, such as about 700 lbs/MSF or more, such as about 800 lbs/MSF or more, such as about 900 lbs/MSF or more, such as about 1000 lbs/MSF or more, such as about 1100 lbs/MSF or more, such as about 1200 lbs/MSF or more, such as about 1300 lbs/MSF or more, such as about 1400 lbs/MSF or more, such as about 1500 lbs/MSF or more, such as about 2000 lbs/MSF or more, such as about 2500 lbs/MSF or more, such as about 3000 lbs/MSF or more. The board weight may be about 5000 lbs/MSF or less, such as about 4500 lbs/MSF or less, such as about 4000 lbs/MSF or less, such as about 3500 lbs/MSF or less, such as about 3000 lbs/MSF or less, such as about 2500 lbs/MSF or less, such as about 2000 lbs/MSF or less, such as about 1800 lbs/MSF or less, such as about 1600 lbs/MSF or less, such as about 1500 lbs/MSF or less, such as about 1400 lbs/MSF or less, such as about 1300 lbs/MSF or less, such as about 1200 lbs/MSF or less. Such board weight may be a dry board weight such as after the board leaves the heating device (e.g., kiln).

EXAMPLES

Test Methods

Stiffening time: The stiffening time is the amount of time for a line drawn through the gypsum slurry to remain visible (e.g., unhealed). In particular, a paper clip tip was used to draw a line through the slurry. The stiffening time was determined as the time at which the line remained visible or it no longer healed.

Set time: The set time is the time between the initial and final set times as determined according to ASTM C266 using a ¼ lb Gilmore needle.

Slump test: The test is conducted after dipping a brass cylinder having a wall thickness of about 0.07 inches, a height of about 4 inches, and an inner diameter of about 2 inches into a low-viscosity lubricating oil bath. The cylinder was removed and excess oil was drained off the surfaces of the cylinder. The cylinder then was placed upright onto a center portion of a clean (i.e., no scratches), dry glass plate having the following dimensions: about 10 inches in length, about 10 inches in width, and about 0.1875 inch thick. The gypsum slurry, which was obtained from about 12 inches down the line from the mixer boot, was immediately poured into the cylinder such that the cylinder was completely filled with a slight excess. The scoop can be a clean metal or plastic scoop of convenient size or can be formed from disposable gypsum board paper. The excess was screed off to a level with the top of the cylinder without dropping any of the slurry onto the surface of the glass plate. Immediately, and at least within about 10 seconds of removing excess slurry, the cylinder was raised vertically with a smooth and uniform motion at a moderate (not rapid) speed, and the slurry contained within the cylinder was allowed to slump to a circular patty onto the surface of the glass plate. After the slurry had solidified, the glass plate was turned over and the diameter of the slump in contact with the glass plate was measured to the nearest ⅛ inch. In particular, the average of two measurements was reported wherein the measurements are taken at right angles to each other.

Nail pull: The nail pull is determined in accordance with ASTM C1396. For these tests, the gypsum board were condition at 70° F. and 50% relative humidity for at least 6 hours.

Example 1

Gypsum boards were made with a formulation including stucco, water (i.e., water to stucco ratio of 0.9), foam, and ball mill accelerator. For the control samples, Plast-L (i.e., mixture of degraded polyamides salified with sodium in aqueous solution and a chemically modified natural polymer in aqueous solution) was used as the set retarder. In the inventive samples, about 1.0 g (0.14 wt. % based on stucco) of sodium monofluorophosphate was provided to the gypsum slurry. The results are shown in the table below:

| Description | Sample No. | Stiffening time (s) | Set time (min:s) | Board Weight (lbs/MSF) | Nail Pull ($lb_f$) | Core Compressive Strength (psi) |
|---|---|---|---|---|---|---|
| Control | CS 1 | 37 | 2:26 | 1337 | 75 | 329 |
| (1.0 g 10% Plast-L) | CS 2 | 35 | 2:36 | 1278 | 66 | — |
| | CS 3 | 37 | 2:47 | 1186 | 50 | — |
| | CS 4 | 35 | 2:25 | 1436 | 84 | — |
| 1.0 g Sodium | S 1 | 36 | 2:30 | 1320 | 73 | — |
| Monofluorophosphate | S 2 | 39 | 2:40 | 1357 | 79 | 371 |
| | S 3 | 38 | 2:35 | 1459 | 93 | — |
| | S 4 | 39 | 2:42 | 1240 | 64 | — |

As shown in the table above, the set time and the stiffening time were comparable between the control and inventive samples. Meanwhile, the nail pull strength, the core compressive strength, and the humidified bond were generally better for the gypsum wallboards made with sodium monofluorophosphate.

Example 2

Gypsum boards were made with a formulation including stucco, water (i.e., water to stucco ratio of 0.9), foam, and ball mill accelerator. In these samples, the effect of the amount of sodium monofluorophosphate (e.g., about 1.5 g (0.21 wt. % based on stucco) and about 2.0 g (0.28 wt. % based on stucco)) was investigated. The results are shown in the table below:

| Description | Sample No. | Stiffening time (s) | Set time (min:s) | Board Weight (lbs/MSF) | Nail Pull ($lb_f$) | Core Compressive Strength (psi) |
|---|---|---|---|---|---|---|
| 1.5 g Sodium | S 5 | 45 | 2:33 | 1297 | 79 | — |
| Monofluorophosphate | S 6 | 42 | 2:28 | 1410 | 94 | — |
| | S 7 | 42 | 2:33 | 1324 | 81 | 389 |
| | S 8 | 44 | 2:50 | 1281 | 75 | — |
| | S 9 | 42 | 2:30 | 1438 | 95 | — |
| 2.0 g Sodium | S 10 | 52 | 2:50 | 1345 | 87 | — |
| Monofluorophosphate | S 11 | 56 | 2:52 | 1300 | 81 | — |
| | S 12 | 58 | 3:05 | 1331 | 90 | 415 |
| | S 13 | 55 | 2:39 | 1373 | 94 | — |
| | S 14 | 54 | 2:42 | 1308 | 87 | — |
| | S 15 | 53 | 2:33 | 1437 | 101 | — |
| | S 16 | 51 | 2:50 | 1241 | 72 | — |

As shown in the table above, the stiffening times were generally longer (possibly indicating more fluidity) while the initial set times were comparable to the control formulations of Example 1. Meanwhile, substantial increases in nail pull and compressive strength were observed when increasing the amount of sodium monofluorophosphate.

Example 3

Gypsum boards were made with a formulation including stucco, sodium monofluorophosphate, starch, foam, and water (i.e., water to stucco ratio ranging from 0.74 to 0.9). Control boards were also made without sodium monofluorophosphate but instead with Plast-L. The results are shown in the table below:

| Sample No. | Water/Stucco Wt. Ratio | Water reduction (%) | Board Weight (lbs/MSF) | $Na_2PO_3F$ (g) | Plast-L (g) | Dispersant (g) | Nail Pull ($lb_f$) |
|---|---|---|---|---|---|---|---|
| S 17 | 0.9 | 0 | 1373 | 2 | 0 | 0 | 94 |
| S 18 | | | 1308 | 2 | 0 | 0 | 87 |
| S 19 | 0.86 | 4.4 | 1399 | 2 | 0 | 0 | 88 |
| S 20 | 0.8 | 11.1 | 1321 | 2 | 0 | 0 | 79 |
| S 21 | | | 1279 | 2 | 0 | 0 | 69 |
| S 22 | 0.77 | 14.4 | 1389 | 2 | 0 | 0 | 74 |
| S 23 | 0.74 | 17.8 | 1381 | 2 | 0 | 0 | 75 |
| S 24 | | | 1335 | 2 | 0 | 0 | 63 |
| S 25 | 0.7 | 22.2 | 1344 | 3 | 0 | 3 | 86 |
| Control Boards with Plast-L | | | | | | | |
| CS 5 | 0.9 | 0 | 1337 | 0 | 1 | 0 | 75 |
| CS 6 | | | 1278 | 0 | 1 | 0 | 66 |
| CS 7 | 0.74 | 17.8 | 1383 | 0 | 1 | 0 | 60 |

As indicated in the table above, when using sodium monofluorophosphate, it allowed for a lower water to stucco ratio while providing a board with desirable properties. When using a dispersant, such as polynaphthalene sulfonate in sample S 25, the reduction in water was even further improved in comparison to a water/stucco weight ratio of 0.9.

Example 4

Gypsum boards were made with a formulation including stucco, sodium monofluorophosphate, retarder, dispersant, BMA, and water. In particular, a 20 wt. % solution of sodium monofluorophosphate was made by adding 100 lbs of sodium monofluorophosphate to 400 lbs of water. The mixture was agitated for a few minutes and left undisturbed overnight. This solution was constantly agitated while feeding directly to the slurry mixer.

The line speed for the trial was 183 feet/minute. The other conditions and changes made during the trial are listed in the table below. The changes indicated in the table below are cumulative. The first sample was taken for the control at a time of 0 minutes.

| Time (mins) | Board weight (lbs/MSF) | Nail Pull ($lb_f$) | Changes | Slump (in) | Stiffening Time (s) | Set Time (min:s) |
|---|---|---|---|---|---|---|
| 0 | 1210 | 76 | Control | 7⅛ | 38 | 2:45 |
| 6 | 1200 | 78 | | | | |
| 72 | 1230 | 74 | Added 12.5 lbs/MSF of | 8⅜ | 70 | 3:13 |
| 75 | 1240 | 80 | 20% SMFP solution. | | | |
| 85 | 1220 | 74 | Cut all retarder. | 8½ | 66 | 2:49 |
| 89 | 1190 | 74 | | | | |
| 93 | — | 71 | Cut all dispersant. | 8¼ | 69 | 3:19 |
| 99 | 1210 | 73 | Cut BMA by 1 lb (16%) | | | |
| 109 | 1210 | 76 | Cut GW by 20 lbs (3%). | 7¾ | 57 | 3:08 |
| 115 | 1220 | 74 | | | | |

As soon as the sodium monofluorophosphate was added, the slump increased by 1¼ inch while the stiffening time increased by 32 seconds and the set time increased by 28 seconds. Removing the retarder and dispersant appeared to show minimal effect on stiffening, slump, and/or the set time. Removal of the ground water reduced the slump to 7¾ inches, still ⅝ inches greater than the control, while the stiffening and the set time were 19 seconds and 23 seconds, respectively, longer than the control. This may suggest that even more water may be reduced. In general, the trial provided evidence of the higher fluidity resulting from the use of sodium monofluorophosphate.

Example 5

Gypsum boards were made with a formulation including stucco, sodium monofluorophosphate, retarder, dispersant, BMA, and water. In particular, an 11 wt. % solution of sodium monofluorophosphate was made by adding 100 lbs of sodium monofluorophosphate to 800 lbs of water. The mixture was agitated for approximately one hour and the solids were completely dissolved. This solution was constantly agitated while feeding directly to the slurry mixer.

The line speed for the trial was 210 feet/minute. The other conditions and changes made during the trial are listed in the table below. The changes indicated in the table below are cumulative. The first sample was taken for the control at a time of 0 minutes.

| Time (mins) | Board weight (lbs/MSF) | Nail Pull (lb$_f$) | Changes | Slump (in) | Stiffening Time (s) | Set Time (min:s) |
|---|---|---|---|---|---|---|
| 0 | 1230 | 75 | Control | 6⅞ | 33 | 2:34 |
| 7 | 1230 | 78 | | | | |
| 101 | 1230 | 77 | Added 20 lbs/MSF of ~11% SMFP solution. | 7 | 45 | 2:26 |
| 106 | 1220 | 74 | Cut all retarder. Cut all dispersant. Added 2 lbs/MSF BMA (40%). Cut GW by 30 lbs/MSF (5%). | | | |
| 112 | 1230 | 81 | Added 1 lb/MSF BMA (20%). | 7 | 34 | 2:18 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

The invention claimed is:

1. A slurry for making a gypsum board, the slurry comprising
   stucco,
   water, and
   a phosphorus containing compound comprising a phosphite, a phosphate having the formula P(O)$_n$(X)$_m$ wherein n is from 0 to 4, m is from 1 to 6, the sum of n and m is from 3 to 6, and X is halogen, sulfur, or selenium, a salt thereof, or a mixture thereof.

2. The slurry of claim 1, wherein the phosphorus containing compound comprises a phosphite.

3. The slurry of claim 1, wherein the phosphorus containing compound comprises a phosphate having the formula P(O)$_n$(X)$_m$ wherein n is from 0 to 4, m is from 1 to 6, the sum of n and m is from 3 to 6, and X is halogen, sulfur, or selenium, a salt thereof.

4. The slurry of claim 3, wherein X includes fluoro.

5. The slurry of claim 3, wherein n is from 2 to 3.

6. The slurry of claim 3, wherein m is from 1 to 2.

7. The slurry of claim 1, wherein the phosphorus containing compound comprises a halophosphate.

8. The slurry of claim 1, wherein the phosphorus containing compound comprises a monohalophosphate.

9. The slurry of claim 1, wherein the phosphorus containing compound comprises a salt including an alkali metal, an alkaline earth metal, a transition metal, or a combination thereof.

10. The slurry of claim 1, wherein the phosphorus containing compound comprises sodium monofluorophosphate.

11. The slurry of claim 1, wherein the phosphorus containing compound is present in the slurry in an amount of from 0.01 wt. % to 5 wt. % based on the weight of the stucco.

12. The slurry of claim 1, wherein the weight ratio of the water to the stucco is from 0.1 to 3.

13. The slurry of claim 1, wherein the slurry further comprises a dispersant.

14. The slurry of claim 13, wherein the dispersant comprises a sulfonate, a polycarboxylate ether, a polycarboxylate ester, or a mixture thereof.

15. The slurry of claim 1, wherein the gypsum slurry is characterized by having a set time of 3.5 minutes or less using a ¼ pound Gillmore needle according to ASTM C266.

16. A method for making a gypsum board, the method comprising
   depositing the slurry of claim 1 on a first facing material,
   providing a second facing material on the slurry, and
   allowing the stucco to convert to calcium sulfate dihydrate.

17. A gypsum board made according to the method of claim 16.

* * * * *